US005587536A

United States Patent [19]

Rasmussen

[11] Patent Number: 5,587,536

[45] Date of Patent: Dec. 24, 1996

[54] DIFFERENTIAL PRESSURE SENSING DEVICE FOR PNEUMATIC CYLINDERS

[76] Inventor: John Rasmussen, 8433 South Ave., Youngstown, Ohio 44514

[21] Appl. No.: 516,375

[22] Filed: Aug. 17, 1995

[51] Int. Cl.$^{6}$ .............................. G01L 7/16; F01B 31/12

[52] U.S. Cl. .............................. 73/744; 91/1

[58] Field of Search .............................. 91/1, 388, 392, 91/403; 73/716, 721, 744; 92/5

[56] References Cited

U.S. PATENT DOCUMENTS

| | | | |
|---|---|---|---|
| 3,541,925 | 11/1970 | Guinot | 91/1 |
| 3,680,583 | 8/1972 | Clair | 137/106 |
| 3,691,902 | 9/1972 | Lebzelter | 91/1 |
| 4,275,793 | 6/1981 | Schiviey, Jr. et al. | 173/9 |
| 4,735,296 | 4/1988 | Pinson | 188/379 |
| 4,748,570 | 5/1988 | Shochi et al. | 91/403 X |
| 4,819,541 | 4/1989 | Pitsch et al. | 91/6 |
| 4,936,143 | 6/1990 | Schutten et al. | 73/597 |

FOREIGN PATENT DOCUMENTS

| | | | |
|---|---|---|---|
| 2509771 | 11/1975 | Germany | 91/1 |

*Primary Examiner*—Richard Chilcot
*Assistant Examiner*—Paul D. Amrozowicz
*Attorney, Agent, or Firm*—Harpman & Harpman

[57] ABSTRACT

A differential pressure control switch system for use in determining the relative position of a piston in a pneumatic cylinder in relation to a pre-set threshold pressure sensing by the differential in the supply side and exhaust side of a double acting pneumatic cylinder and a four-way directional control valve associated therewith.

4 Claims, 2 Drawing Sheets

DIFFERENTIAL PRESSURE SENSING DEVICE FOR PNEUMATIC CYLINDERS

BACKGROUND OF THE INVENTION

1. Technical Field

This device relates to control systems for pneumatic cylinders that have heretofore utilized proximity switches and separate pressure sensing valves to react to the position of the piston during operation as an end to stroke detection.

2. Description of Prior Art

Prior art devices of this type have relied on a variety of different switching and sensing devices to monitor pneumatic and hydraulic cylinder positions and control, see for example U.S. Pat. Nos. 3,680,583, 3,691,902, 4,275,793, 4,819,541 and 4,936,143.

In U.S. Pat. No. 3,680,583 an automatic four-way hydraulic operated valve is disclosed that uses the pressure build-up within the cylinder and releases same using a single spool package type unit.

U.S. Pat. No. 3,691,902 discloses a cylinder and plunger control valve that senses the true end of stroke of a piston in a cylinder.

U.S. Pat. No. 4,275,793 claims a control system for rock drills wherein location of the drill to the control valve is accomplished by measuring the pressure and flow rate of hydraulic fluid to the motor with pressure responsive switches.

U.S. Pat. No. 4,819,541 on a control valve for double acting pneumatic drive cylinders adjust airflow through variable orifices and check valves creating a restrictive flow path in one direction to prevent rebound with strong holding pressure.

U.S. Pat. No. 4,936,143 is directed to cylinders having piston position measuring configurations in which an ultrasonic transducer is used to determine the piston's position within the cylinder.

OBJECTIVES AND ADVANTAGES

It is an object of the present invention to provide a sensor in the supply and exhaust lines of a pneumatic cylinder in place of proximity switches to sense relative position of the piston by differential of pressures therebetween.

It is a further object of the present invention to provide constant and very accurate piston positioning which is useful in clamping applications of inconsistent work pieces for spot welding applications where prior art electronic magnetic proximity devices do not work well.

Another advantage of the present invention is that it can be mounted away from the cylinder work area as well as the ability to sense dependently of magnetic bands or metal parameters.

Other objects and advantages of the present invention will be obvious to those skilled in the art. It should be noted, however, that the drawings are designed for purposes of illustration only and not as a definition of the limits of the instant invention for which reference should be made to the claims appended to the hereto.

SUMMARY OF THE INVENTION

A differential pressure sensing device that progressively senses the differential pressure between pneumatic cylinder lines comparing same to preset cross-over point that initiates a sensor output to indicate same.

DESCRIPTION OF THE PREFERRED EMBODIMENT

Figure 1:
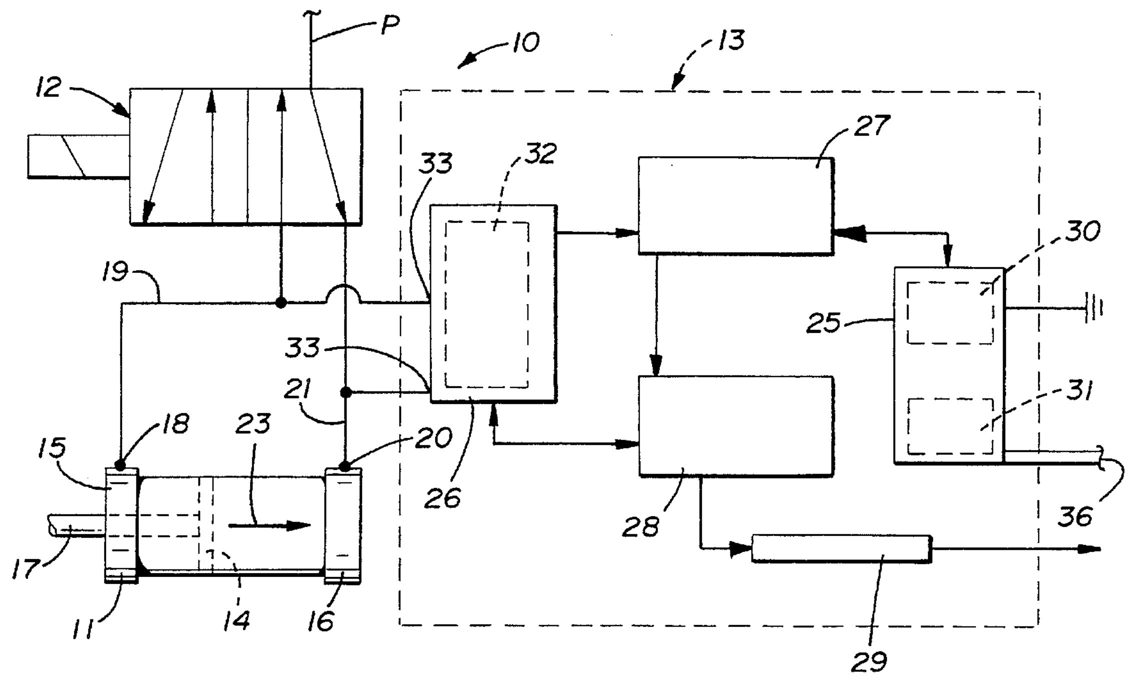
FIG. 1 is a schematic diagram showing the sensor of the invention with a pneumatic cylinder in a control valve system.

Referring to FIG. 1 of the drawings, a cylinder and control valve assembly 10 is illustrated having a pneumatic cylinder 11, a four-way control valve 12 and a pneumatic pressure sensor 13. The pneumatic cylinder 11 is provided with a piston 14 shown in dotted lines movable therein between a front end 15 and a rear end 16 of the cylinder as will be well understood by those skilled in the art.

The piston 14 is connected to a piston rod 17 that extends from the front end 15 of the pneumatic cylinder 11. A pressure port 18 is connected to a source of pressurized air P or other pneumatic operating fluid via a pressure line 19 extending therebetween. A second pressure port 20 in the rear end 16 of the pneumatic cylinder is also connected to the source of pressurized air P by supply line 21. The control valve 12 communicates with the respective cylinder supply lines 19 and 21 and provides selective directional flow control of the pressurized air P supply and exhaust of the pressurized air to actuate the piston 14 within the pneumatic cylinder between the respective pressure ports 18 and 20.

It will be evident from the foregoing that when fluid pressure P is applied to the pressure line 19 through the selective four-way directional valve 12 and return from the pressure line 21 that the piston 14 will move within the pneumatic cylinder 11 as indicated by the directional arrow 23.

Conversely, upon switching of the four-way directional valve 12 to the pressure input on pressure line 21 and the exhaust pressure line 19, the travel direction of the piston 14 will be reversed returning it to the front end of the cylinder 12.

The pneumatic pressure sensor 13 is of a solid state construction having a power supply section 25, a pressure sensing section 26 with an amplifying section 27 and a pressure trip point adjustment 28 and an output section at 29.

The power supply section 25 is comprised of a voltage and current regulation 30 and a source of power at 31. The pressure sensing section 26 is comprised of a piezoeresistive differential pressure sensor 32 having inlet ports 33 which are in direct communication with the heretofore described pressure lines 19 and 21.

The amplification section 27 amplifies voltage variations generated by the variations in resistant output from the piezoeresistive differential pressure sensor 32. The pressure trip point adjustment 28 defines user adjustable voltage level and compares it with the voltage level of the amplified output of the pressure sensor 32 and generates an output wherein differential levels cross as illustrated in FIG. 2 of the drawings as will be described in greater detail hereinafter.

Figure 3:
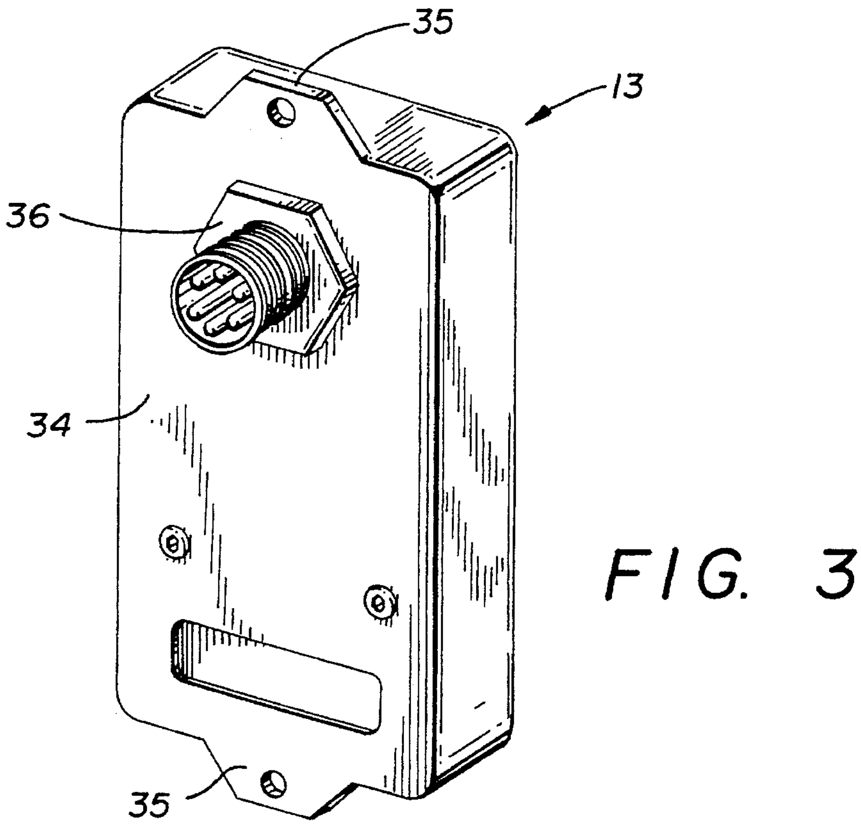
FIG. 3 is a perspective view of the instant invention in a use configuration.
Figure 4:
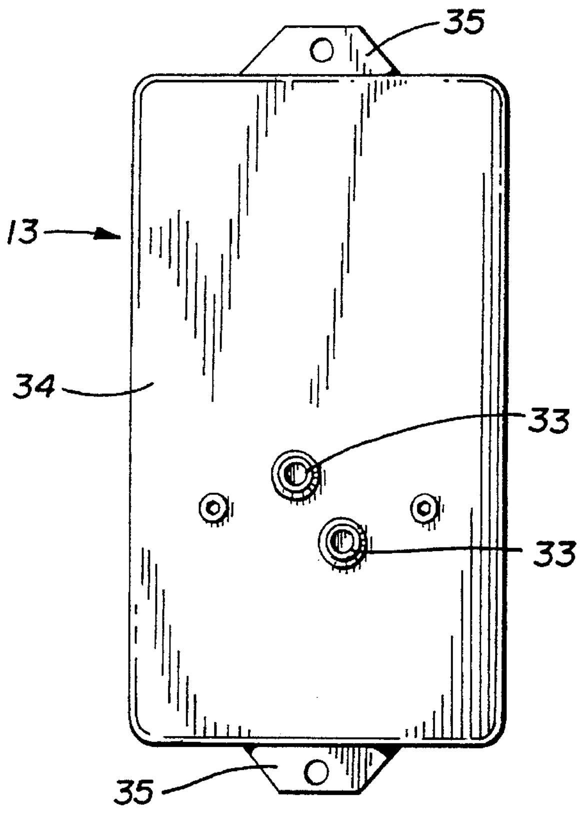
FIG. 4 is a rear elevational view of the instant invention shown in FIG. 3.

Referring to FIGS. 3 and 4 of the drawings, the pneumatic sensor 13 of the invention can be seen in operable configuration having a main enclosure case 34 with oppositely disposed apertured mounting tabs 35. A six pin connector port 36 extends outwardly from the enclosure case 34 to receive a control output communication linkage (not shown) inclusive of the power supply input and the pressure line adjustment input.

Figure 2:
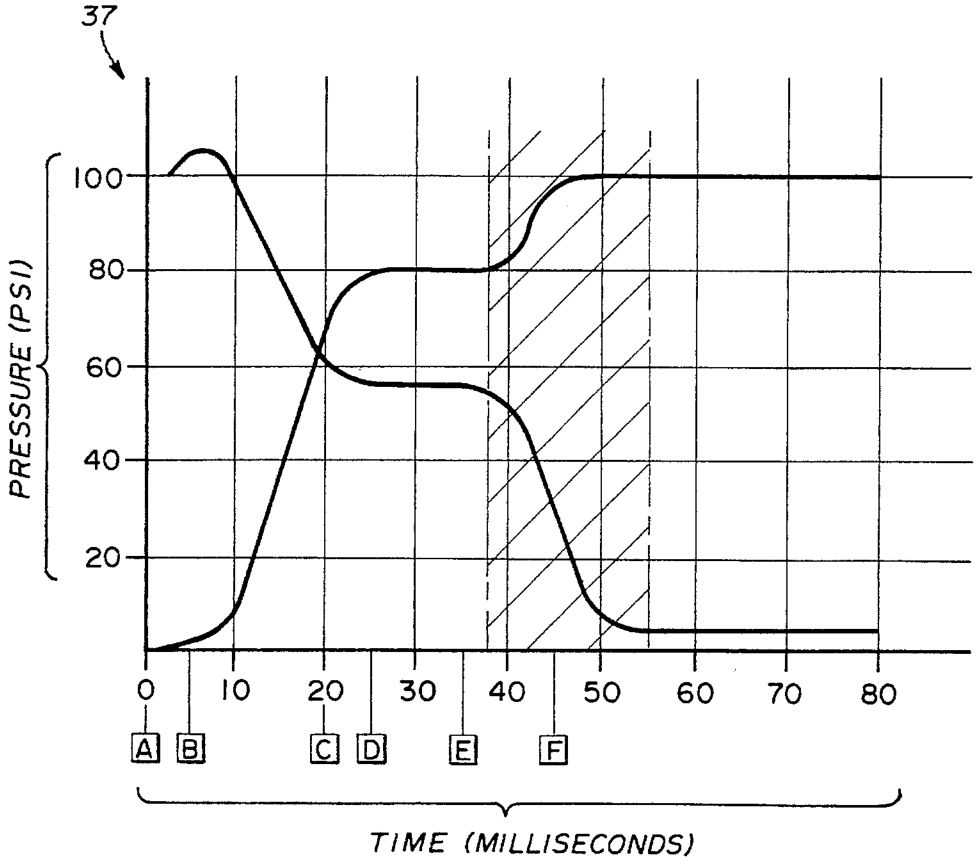
FIG. 2 is a time to pressure graph illustrating piston reaction to variations of time and pressure.

Referring now to FIG. 1 and specifically to FIG. 2 of the drawings, an operational diagram is illustrated indicating the relationship between effective pressure and time and associated position and determination of the steps in a typical activation of a pneumatic cylinder under fluid pressure.

In operation, the four-way directional control valve 12 selects input pressure from the pressure line P to the pressure line 19 as indicated by time point A in FIG. 2 of the drawings in the time pressure sequential relationship graph 37.

Pressure increases in the pressure line 19 and dissipates in the pressure line 21 until cylinder load is overcome indicated by point B. Line pressure in pressure line 19 exceeds line pressure in pressure line 21 at point C with the piston 14 beginning travel at point D. As effective end of stroke position of piston 14 is reached which can be accomplished anywhere along the piston travel path depending on the increased pressure on the pressure line 19 and the decrease of pressure in the pressure line 21 as indicated at point E.

When the pressure differential increases to the preset trip point (set by trip point adjustment 28) and wherein the exhaust pressure decreases to its preset trip point, the output at F will be activated as in output 29 in FIG. 1.

A very finite sensing on pressure using the exhaust side between the pneumatic cylinder and the four-way directional control valve 12 creates the balance for exact piston position sensing based on differential pressure.

It will be apparent from the above description that the analogue range is adjustable by using the input pressure as the motivative force and the back-up pressure as a reference force.

It will thus be seen that a new and novel differential pressure sensor system has been illustrated and described and it will be apparent to those skilled in the art that various changes and modifications may be made therein without departing from the spirit of the invention and that the specification and drawings are for illustration purposes and should not be determined as a limiting factor in the scope of the invention which is derived by the claims attached hereto.

Therefore I claim:

1. A pneumatic cylinder control positioning determination system comprising, a pneumatic cylinder having a piston movable therein from a retracted position to an extended position, pressure inlet and outlet ports within said cylinder, pressure lines extend from said ports, a control valve interconnected with said pressure ports via said pressure lines, a pressure differential sensor switch in communication with said pressure ports between said cylinder and said control valve said pressure differential sensor switch comprising pressure differential sensor, calculating a control output value from the pressure differential between said inlet ports and said outlet ports within said cylinder.

2. The control and positioning determination system of claim 1 wherein the control valve comprises a four-way directional valve, said directional valve in communication with a source of fluid under pressure.

3. The control and positioning determination system of claim 1 wherein said pressure sensor switch further comprises amplifier means, selective output sections and a power supply section.

4. The control and positioning determination system of claim 1 wherein said means for adjusting said pressure differential sensor comprises a trip point adjustment interconnected therewith.

* * * * *